Oct. 5, 1965    J. MORKOSKI ETAL    3,209,839
HYDRAULIC CONTROLLED GAUGE AND FURROW WHEEL
Filed May 28, 1964    4 Sheets-Sheet 1
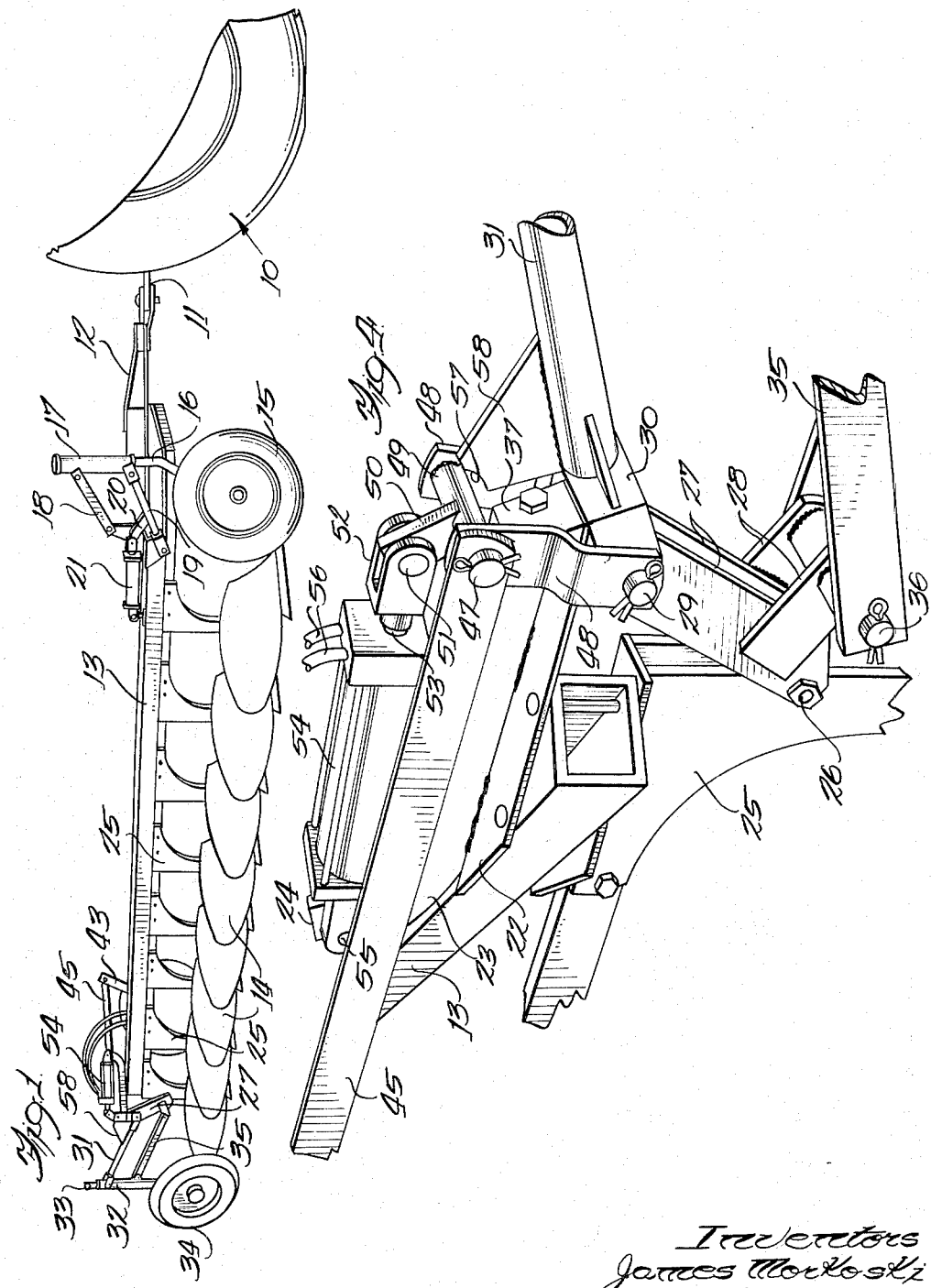
Inventors
James Morkoski
Gerald G. Ward
J. K. McNall
Attorney

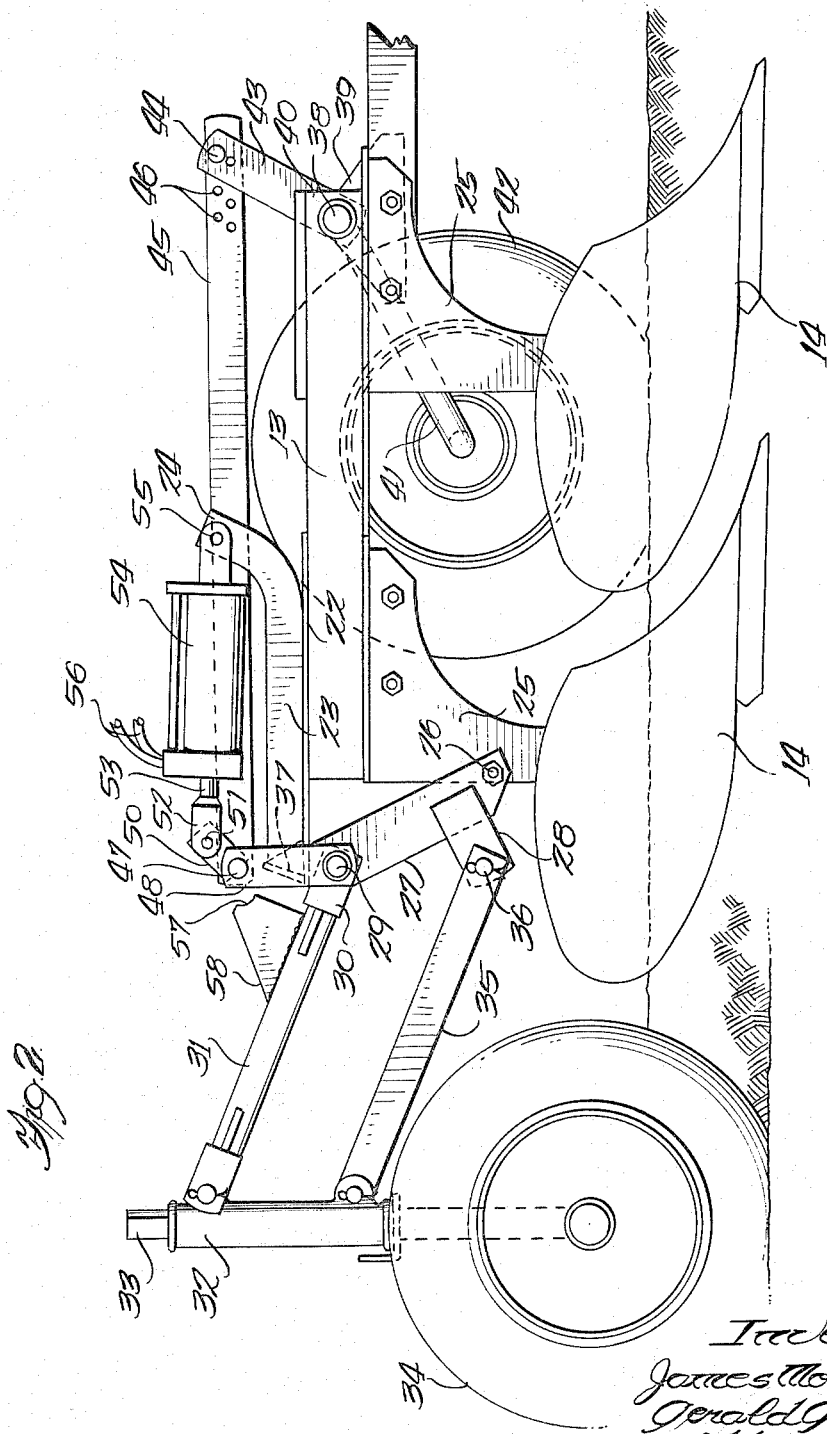

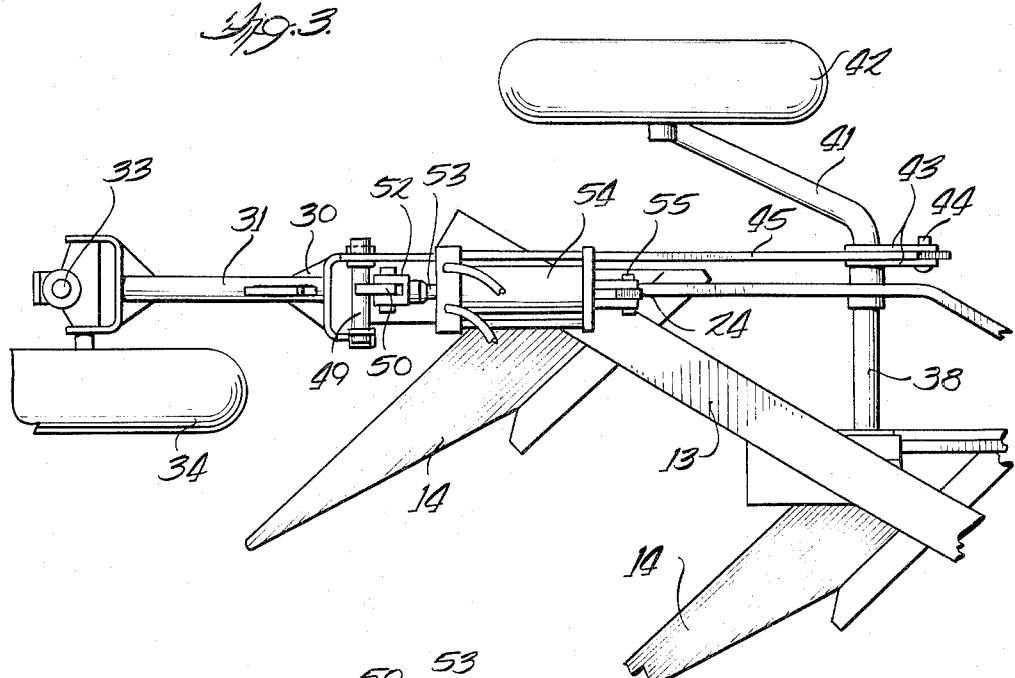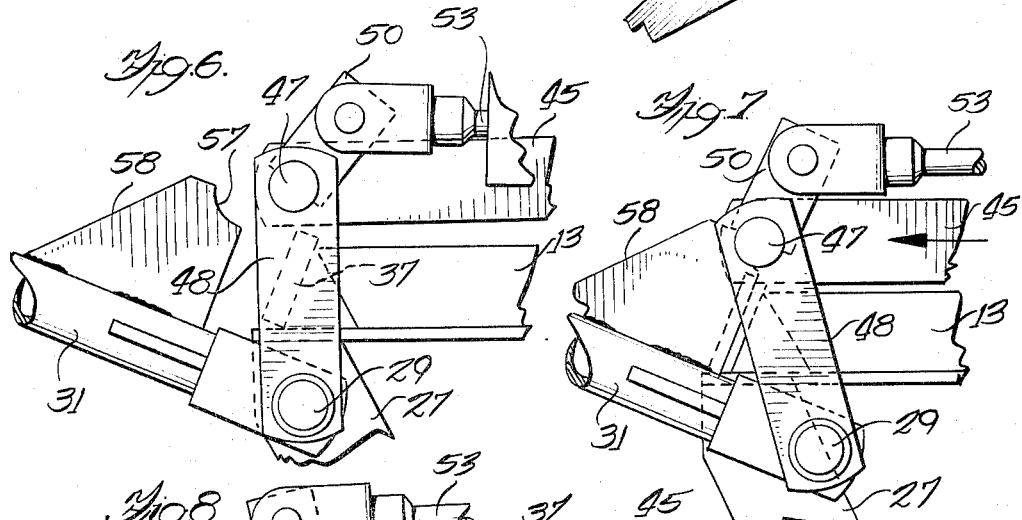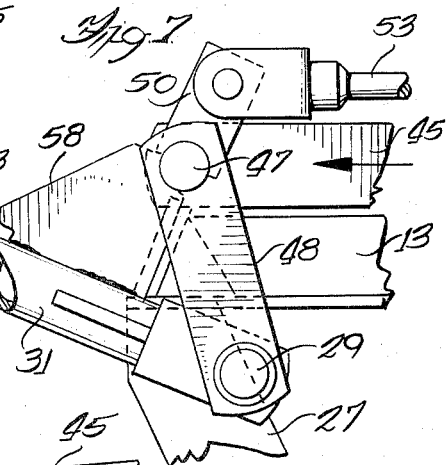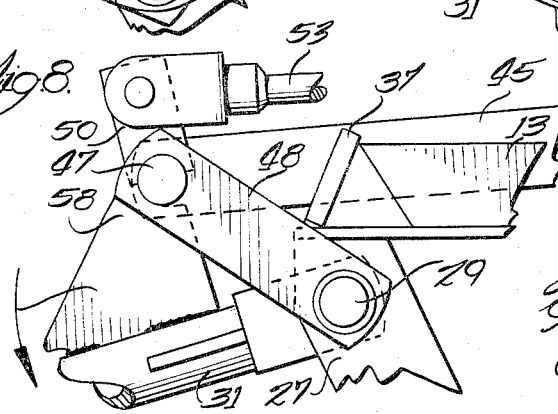

Oct. 5, 1965 J. MORKOSKI ETAL 3,209,839
HYDRAULIC CONTROLLED GAUGE AND FURROW WHEEL
Filed May 28, 1964 4 Sheets-Sheet 4
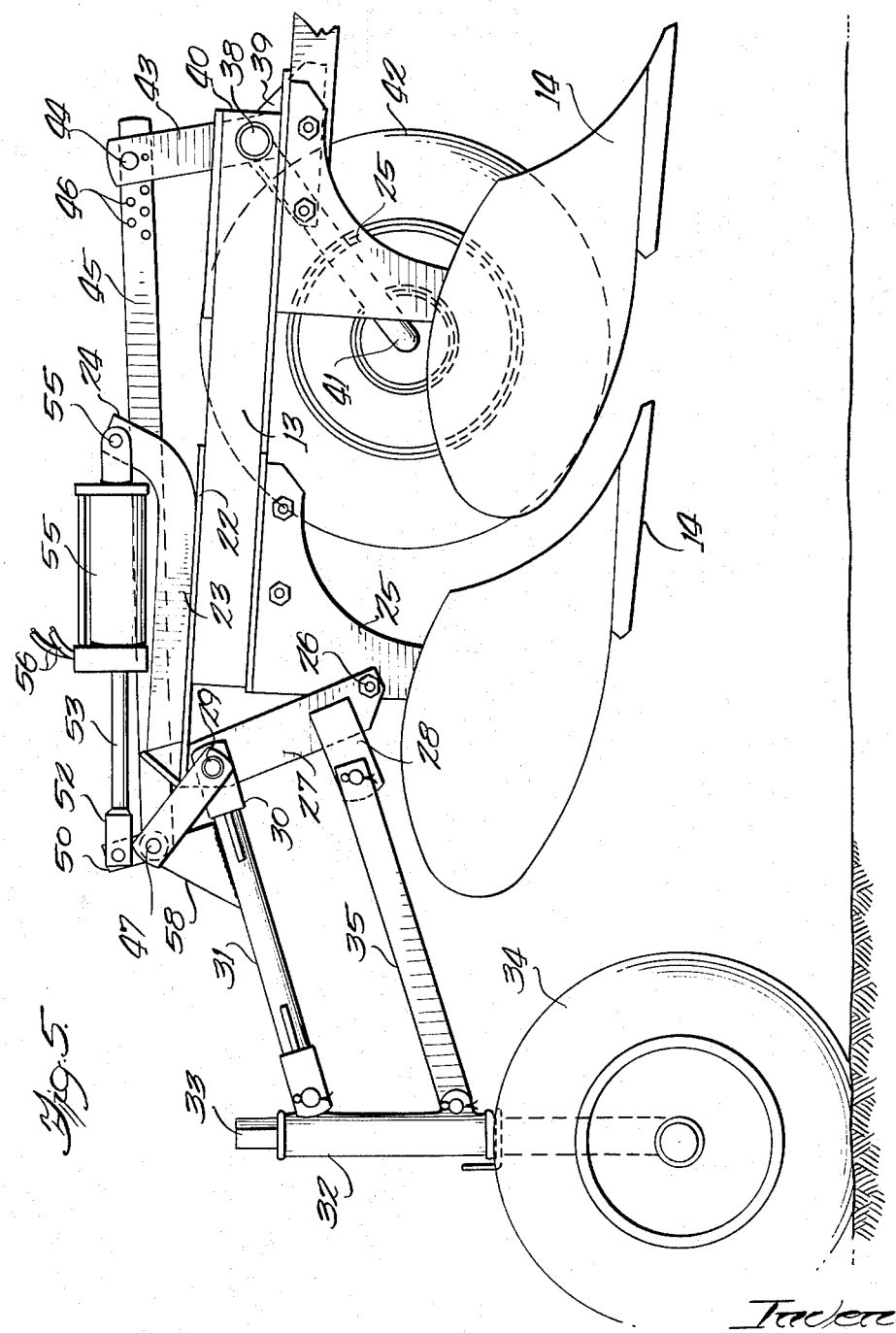

United States Patent Office 3,209,839
Patented Oct. 5, 1965

3,209,839
HYDRAULIC CONTROLLED GAUGE AND FURROW WHEEL
James Morkoski, Clarendon Hills, and Gerald G. Ward, Naperville, Ill., assignors to International Harvester Company, Chicago, Ill., a corporation of New Jersey
Filed May 28, 1964, Ser. No. 371,065
5 Claims. (Cl. 172—405)

This invention relates to agricultural implements and particularly to plows. More specifically, the invention concerns a plow having an elongated frame supported at its tail end by a wheel adapted to ride in the furrow.

In plows of this type it is common practice to utilize the tail wheel as both means for lifting the rear end of the plow for transport and to gauge the depth of operation of the earth-working units, and a hydraulic cylinder is usually provided for this purpose.

In practice, inasmuch as gauging from the bottom of the furrow is unsatisfactory, a gauge wheel is often provided to run on the unplowed land, and a separate hydraulic cylinder has been required for its operation so that depth adjustment could be made independently of operation of the furrow wheel to raise and lower the plow.

An object of the present invention is the provision of single power operated means for adjusting both the furrow wheel and the gauge wheel of a moldboard plow or the like.

Another object of the invention is the provision of a novel single power operated means in the form of a hydraulic cylinder connected to the furrow and gauge wheels in such a way as to accommodate adjustment of the gauge wheel and, therefore, the operating depth of the plow independently of adjustment of the rear furrow wheel.

Another object of the invention is the provision of novel means for controlling the operation of the furrow and gauge wheels of an earth-working implement such as a moldboard plow, utilizing a single hydraulic cylinder for raising and lowering the rear end of the plow as well as adjusting the depth of operation thereof, wherein actuation of the hydraulic cylinder in one range adjusts the gauge wheel without affecting the operation of the furrow wheel, and in another range swings the furrow wheel vertically to raise and lower the implement.

Other objects and advantages of the invention will become clear from the following detailed description when read in conjunction with the accompanying drawings wherein:

FIGURE 1 is a view in perspective of a multi-bottom moldboard plow incorporating the features of this invention connected to a tractor to be propelled thereby;

FIGURE 2 is an enlarged view in side elevation of the rear end of the plow of FIGURE 1 showing the positions of the parts with the earth-working units in their operating position;

FIGURE 3 is a plan view of the structure shown in FIGURE 2;

FIGURE 4 is a view in perspective on an enlarged scale, and from the rear, of a portion of the plow shown in FIGURE 1;

FIGURE 5 is a view similar to FIGURE 2, illustrating the positions of the parts when the plow is in its transport position;

FIGURE 6 is an enlarged detail of a portion of the structure shown in FIGURE 2;

FIGURE 7 is a detail showing the positions of the parts just prior to lifting the rear end of the plow; and FIGURE 8 is a detail showing the positions of the parts when the plow has been lifted as in FIGURE 5.

In the drawings, the numeral 10 designates a tractor having a drawbar 11 to which is pivotally connected the hitch structure 12 of a plow having an elongated diagonally extending supporting frame member 13 upon which is mounted a plurality of plow units 14.

The front end of the plow frame 13 is supported by a furrow wheel 15 at the lower end of a spindle 16 rotatable in a sleeve 17 carried at the ends of vertically spaced links 18 and 19 pivoted to the frame, link 19 having a lug 20 affixed thereto connected to one end of a hydraulic ram 21, the other end of which is anchored to the plow frame, and is operable to raise and lower the wheel 15.

The rear end of frame 13 has mounted thereon a plate 22 to which is affixed a bar 23 projecting rearwardly from the frame and having an upwardly bent forward end 24.

Each of the plow bottoms or units 14 is carried at the lower end of a standard 25 secured to the frame, the rearmost standard 25 having secured to it by a bolt 26 a pair of laterally spaced straps 27 to which are secured rearwardly extending ears 28, and the upper ends of which are affixed to the rear end of plate 22.

The upper ends of straps 27 carry a pivot pin 29 to which is pivoted a clevis 30 secured to the forward end of a link 31, the rear end of which is pivotally connected to a bearing sleeve 32 in which is rotatably received a vertical spindle 33 having mounted on its lower end a rear furrow wheel 34. A lower link 35, parallel to link 31, is also pivotally connected at its rear end to bearing sleeve 32, and its forward end is bifurcated and mounted on a pivot pin 36 carried by ears 28.

Links 31 and 35 and furrow wheel 34 are therefore capable of movement in a vertical plane between positions corresponding to the operating and transport positions of the plow as illustrated in FIGURES 2 and 5. A plate 37 secured to the end of plate 22 and bar 23 constitutes a stop engageable by the forward end of link 31 to limit the upward swinging of the furrow wheel.

A transversely extending axle 38 is rockably mounted in brackets 39 and 40 secured to the frame 13, and the landward end of the axle is bent downwardly and rearwardly to form a crank arm 41 upon which is mounted a gauge wheel 42. A rock arm 43 is affixed to and extends upwardly from axle 38 and is pivotally connected by a pin 44 to the rear end of a strap 45 having a plurality of openings 46 therein to adjustably receive pin 44. The forward end of strap 45 is mounted upon a pivot pin 47 carried at the upper end of an arm 48 comprising spaced links, the lower end of which straddle plate 22 and are mounted upon pin 29.

A spacer 49 in the form of a sleeve pivotally receiving pin 47 extends between the upper ends of members 48 and has affixed thereto a lug 50. Lug 50 carries a pin 51 upon which is mounted a clevis 52 at the end of a piston rod 53 slidably received in a hydraulic cylinder 54 anchored at 55 to the end 24 of bar 23.

Fluid under pressure is supplied to cylinder 54 from any suitable source through hose lines 56, and it should be clear that extension of rod 53 in cylinder 54 will rock arm 48 rearwardly about its pivot 29, carrying with it strap 45, and rocking arm 43 in a direction to lower gauge wheel 42 and adjust the position of the plow bottoms 14 to a shallower plowing depth. Retraction of rod 53 and cylinder 54 will elevate gauge wheel 42 to increase the depth of operation of the plow bottoms. This range of operation of cylinder 54 and rocking of member 48 about the axis of pin 29 allows the operating depth of the plow units to be adjusted without affecting the vertical position of tail wheel 34.

In order to raise the plow to the transport position of FIGURE 5 from the operating position of FIGURE 2, piston rod 53, after passing through the adjusting range for gauge wheel 42, rocks member 48 rearwardly until spacer sleeve 49 engages in a groove 57 formed in the upper end of an abutment member 58 affixed to and projecting upwardly from upper link 31. Continued extension of the rod 53 with respect to cylinder 54 swings links 31 and 35 and tail wheel 34 downwardly to elevate the rear end of the plow frame to the transport position of FIGURE 5.

From the foregoing it should be clear that applicants have devised a novel single control means for raising and lowering a plow and for adjusting the operating depth of the plow units independently of the operation of the rear furrow wheel.

It is believed that the construction and operation of the hydraulically controlled gauge and furrow wheels of this invention will be clearly understood from the foregoing description. It should likewise be understood that the invention has been described in its preferred embodiment and that modifications may be made therein without departing from the spirit of the invention or the scope of the appended claims.

What is claimed is:

1. In a furrow-forming implement having an elongated tool-carrying frame including hitch means at its forward end adapted for connection to a tractor, a rear furrow wheel adapted to ride in the furrow mounted on the rear end of the frame for vertical movement relative to the frame between operating and transport positions and a gauge wheel arranged to ride upon the land mounted on the frame for vertical movement relative thereto to adjust the operating depth of the implement, the mounting of said rear furrow wheel on the frame including means accommodating free vertical floating movement of the rear furrow wheel relative to the frame in the operating position of the implement, a hydraulic cylinder mounted on the rear portion of the frame having parts relatively movable upon actuation of said cylinder, means operatively connecting one of said parts to said gauge wheel for vertically adjusting the latter, independently of said rear furrow wheel in the operating position of the implement, said one of said parts being movable in one direction to lower said gauge wheel and raise the frame to its transport position, and means forming a lost-motion connection between said one of said parts and said rear furrow wheel, said lost-motion connection being effective after a predetermined relative movement of said one of said parts in said one direction to lower said rear furrow wheel.

2. The invention set forth in claim 1, wherein said gauge wheel is carried by an axle mounted on the frame having an arm secured thereto and connected to said one of said parts to rock the axle and vertically swing the gauge wheel upon movement of said one of said parts and wherein said rear furrow wheel is swingably mounted on the frame by linkage which is operatively engageable with said one of said parts after a predetermined movement thereof in said one direction relative to the other of said parts.

3. The invention set forth in claim 2, wherein a rockable member is mounted on the frame and said hydraulic cylinder is anchored to the frame and has a piston rod slidable therein connected to said rockable member, said rockable member being movable into and out of operative engagement with said linkage and having a connection to said arm.

4. The invention set forth in claim 3, wherein stop means on the frame is engageable by said linkage to limit upward swinging of said furrow wheel relative to the frame, and an abutment member is carried by said linkage and engageable with said rockable member.

5. The invention set forth in claim 4, wherein said rockable member is normally out of engagement with said abutment member when the plow is in its operating position, whereby a range of operation of said hydraulic cylinder is provided accommodating adjustment of said gauge independently of said furrow wheel.

References Cited by the Examiner

UNITED STATES PATENTS 2,939,539 6/60 Kramer _____ 172—413 X

FOREIGN PATENTS 654,530 7/34 Germany.

ANTONIO F. GUIDA, *Acting Primary Examiner.*

T. GRAHAM CRAVER, *Examiner.*